(12) United States Patent
Harper et al.

(10) Patent No.: US 11,206,318 B2
(45) Date of Patent: Dec. 21, 2021

(54) CLOUD INTEROPERABILITY (71) Applicant: ABB Schweiz AG, Baden (CH)

(72) Inventors: Karl Eric Harper, Cary, NC (US); Divyasheel Sharma, Karnataka (IN)

(73) Assignee: ABB Schweiz AG, Baden (CH)

( * ) Notice: Subject to any disclaimer, the term of this patent is extended or adjusted under 35 U.S.C. 154(b) by 147 days.

(21) Appl. No.: 16/384,991

(22) Filed: Apr. 16, 2019

(65) Prior Publication Data
US 2020/0336570 A1   Oct. 22, 2020

(51) Int. Cl.
*G06F 15/173* (2006.01)
*H04L 29/06* (2006.01)
*H04L 12/46* (2006.01)

(52) U.S. Cl.
CPC ............ *H04L 69/08* (2013.01); *H04L 12/46* (2013.01); *H04L 63/0272* (2013.01); *H04L 67/42* (2013.01)

(58) Field of Classification Search
CPC ..... H04L 69/08; H04L 12/46; H04L 63/0272; H04L 67/42
See application file for complete search history.

(56) References Cited

U.S. PATENT DOCUMENTS

| | | | | |
|---|---|---|---|---|
| 9,763,118 B1* | 9/2017 | Stamatakis | ............ | G06F 3/0482 |
| 2002/0156867 A1* | 10/2002 | Iwami | ............ | G06F 16/10 |
| | | | | 709/218 |
| 2003/0177251 A1* | 9/2003 | Suzuki | ............... | H04N 7/17318 |
| | | | | 709/229 |
| 2004/0078424 A1* | 4/2004 | Yairi | ............... | H04L 51/04 |
| | | | | 709/203 |
| 2004/0083295 A1* | 4/2004 | Amara | ............... | H04L 12/4633 |
| | | | | 709/229 |
| 2004/0093397 A1* | 5/2004 | Chiroglazov | ............... | G06Q 10/10 |
| | | | | 709/219 |
| 2007/0286157 A1* | 12/2007 | Shaikh | ............... | H04L 65/1009 |
| | | | | 370/351 |
| 2008/0069121 A1* | 3/2008 | Adamson | ............... | H04L 41/00 |
| | | | | 370/401 |
| 2009/0134998 A1* | 5/2009 | Baum | ............... | H04L 67/025 |
| | | | | 340/539.1 |

(Continued)

OTHER PUBLICATIONS

European Search Report for EP 20 16 8883, dated Aug. 14, 2020, 6 pages.

(Continued)

*Primary Examiner* — Razu A Miah
(74) *Attorney, Agent, or Firm* — Armstrong Teasdale LLP (57) ABSTRACT

Illustrative embodiments of systems and methods for providing interoperability between multiple data providers and/or customers are disclosed. In some embodiments, a method may include receiving, by a first server, a second gateway associated with a second server, wherein the second gateway is configured to translate data into a second protocol associated with the second server; deploying, by the first server, the second gateway on the first server; receiving, by the first server, a first request for first data from the second server; transferring, by the first server in response to receiving the first request, the first data into the second gateway; and translating, by the second gateway, the first data into the second protocol.

17 Claims, 5 Drawing Sheets

(56) References Cited

U.S. PATENT DOCUMENTS

| | | | | |
|---|---|---|---|---|
| 2010/0235433 | A1* | 9/2010 | Ansari | G10L 15/22 709/203 |
| 2011/0010016 | A1* | 1/2011 | Giroti | G06Q 10/06 700/291 |
| 2011/0302629 | A1* | 12/2011 | Whitson | G06F 21/6218 726/3 |
| 2012/0303828 | A1* | 11/2012 | Young | G05B 23/0286 |
| 2013/0013739 | A1* | 1/2013 | Grimault | H04L 29/12462 709/217 |
| 2013/0318231 | A1* | 11/2013 | Raji | H04L 67/125 709/224 |
| 2014/0201381 | A1* | 7/2014 | Shimizu | H04L 69/24 709/230 |
| 2015/0113052 | A1* | 4/2015 | Chen | H04L 67/16 709/203 |
| 2016/0044136 | A1 | 2/2016 | Schiff et al. | |
| 2016/0337450 | A1* | 11/2016 | Anantharam | G06F 9/45533 |
| 2016/0344745 | A1* | 11/2016 | Johnson | H04L 63/08 |
| 2017/0033930 | A1* | 2/2017 | Costa | G06F 21/62 |
| 2017/0289360 | A1* | 10/2017 | Baum | H04M 11/04 |
| 2017/0347283 | A1* | 11/2017 | Kodaypak | H04L 41/022 |
| 2018/0026813 | A1 | 1/2018 | Meulenhoff et al. | |
| 2018/0309786 | A1* | 10/2018 | Apelewicz | H04L 67/12 |

OTHER PUBLICATIONS

Hart et al., "Power and Trust: Critical Factors in the Adoption and Use of Electronic Data Interchange", https://www.researchgate.net/profile/Carol_Saunders3/publication/242504311_Power_and_Trust_Critical_Factors_in_the_Adoption_and_Use_of_Electronic_Data_Interchange/links/54c7c49f0cf238bb7d0b3bb5.pdf, downloaded May 7, 2019, 22 pages.

Schadow et al., "The HL7 Reference Information Model Under Scrutiny", http://amisha.pragmaticdata.com/~schadow/Schadow-MIE06-r3 pdf, downloaded May 7, 2019, 6 pages.

Brush et al., "Home Automation in the Wild: Challenges and Opportunituies", http://colindixon.com/wp-content/uploads/2012/04/homeos-chi2011.pdf, downloaded May 7, 2019, 10 pages.

Munoz et al., "Interoperability in large scale cyber-physical systems", IEEE 17th Conference on Emerging Technologies Factory Automation (ETFA), DOI:10.1109/ETFA.2012.6489788 (2012), 7 pages.

"Dec. 2016 Theme: Interoperability in the Internet of Things", https://www.computer.org/publications/tech-news/computing-now/interoperability-in-the-internet-of-things, downloaded May 7, 2019, 12 pages.

* cited by examiner

CLOUD INTEROPERABILITY

TECHNICAL FIELD

The present disclosure relates to systems and methods for providing cloud interoperability between multiple data providers and/or customers.

BACKGROUND

Interoperability is a wide ranging concern in Industrial Internet of Things (IIoT) ecosystems and frequently cited as a critical challenge. Generally, each IIoT system has its own syntax and semantics that were built up during its design and development. As such, multiple data providers and customers are often forced to adopt a single system to agree upon a single protocol across an entire ecosystem in order to exchange data.

SUMMARY

The present disclosure includes one or more of the features recited in the appended claims and/or the following features which, alone or in any combination, may comprise patentable subject matter.

According to one aspect, a first server includes a network communicator, a gateway deployment logic unit, and a gateway logic unit. The network communicator is configured to receive a second gateway associated with a second server and to receive a request for data from the second server. The gateway deployment logic unit is configured to deploy the second gateway on the first server, wherein the second gateway is configured to translate the data into a second protocol associated with the second server. The gateway logic unit is configured to transfer, in response to receiving the request, the data into the second gateway for translation into the second protocol.

In some embodiments, the network communicator may be further configured to obtain the data from a plant compute device. In such embodiments, the data may be filtered by a customer associated with the plant compute device based on a service agreement between an owner of the first server and the customer and translated by a first gateway deployed on the plant compute device into a first protocol associated with the first server.

In some embodiments, the network communicator may be further configured to obtain the data from a third server via a first gateway deployed on the third server. In such embodiments, the first gateway may be configured to translate data into a first protocol associated with the first server.

In some embodiments, to deploy the second gateway may include to deploy the second gateway in a secured environment that is isolated to limit interactions with other applications running on the first server.

In some embodiments, the gateway logic unit may be further configured to determine whether the second server is authorized to obtain the data. In such embodiments, to transfer the data may include to transfer the data in response to a determination that the second server is authorized to obtain the data.

In some embodiments, the network communicator may be further configured to transmit the translated data to the second server.

In some embodiments, the gateway deployment logic unit may be further configured to cause the network communicator to transmit a first gateway associated with the first server to the second server. In such embodiments, the first gateway may be configured to be deployed in the second server to translate data into a first protocol associated with the first server. Additionally, in some embodiments, the network communicator may be further configured to transmit a request for data to the second server and to obtain, in response to transmitting the request, the data in the first protocol from the second server.

According to another aspect, a method includes receiving, by a first server, a second gateway associated with a second server, wherein the second gateway is configured to translate data into a second protocol associated with the second server, deploying, by the first server, the second gateway on the first server, receiving, by the first server, a first request for first data from the second server, transferring, by the first server in response to receiving the first request, the first data into the second gateway, and translating, by the second gateway, the first data into the second protocol.

In some embodiments, the method may further include obtaining the first data from a plant compute device. In such embodiments, the first data may be filtered by a customer associated with the plant compute device and translated by a first gateway deployed in the plant compute device into a first protocol associated with the first server.

In some embodiments, the method may further include obtaining the first data from a third server via a first gateway deployed on the third server. In such embodiments, the first data may be translated into a first protocol associated with the first server by the first gateway.

In some embodiments, deploying the second gateway may include deploying the second gateway in a secured environment that is isolated to limit interactions with other applications running on the first server.

In some embodiments, the method may further include determining, by the second gateway, whether the second server is authorized to obtain the first data. In such embodiments, transferring the first data may include transferring the first data in response to determining that the second server is authorized to obtain the first data.

In some embodiments, the method may further include transmitting the first data from the second gateway to the second server.

In some embodiments, the method may further include transmitting, by the first server, a first gateway associated with the first server to the second server. In such embodiments, the first gateway may be configured to be deployed in the second server to translate data into a first protocol associated with the first server. Additionally, the method may further include transmitting, by the first server, a second request for second data to the second server, and obtaining, by the first server in response to transmitting the second request, the second data in the first protocol from the second server.

According to another aspect, a system includes a first server and a second server. The second server is configured to receive a first gateway associated with the first server, deploy the first gateway on the second server, wherein the first gateway is configured to translate data into a first protocol associated with the first server, receive a first data request from the first server, and transfer, in response to receiving the first data request, first data into the first gateway for translation into the first protocol and transmission to the first server. Additionally, the first server is configured to receive a second gateway associated with the second server, deploy the second gateway on the first server, wherein the second gateway is configured to translate data into a second protocol associated with the second server, receive a second data request from the second server, and transfer, in response to receiving the second data request, second data into the second gateway for translation into the second protocol and transmission to the second server.

In some embodiments, the system may further include a plant compute device that is configured to receive the first gateway associated with the first server, deploy the first gateway on the plant compute device, and provide plant data obtained by the plant compute device to the first gateway for translation into the first protocol and transmission to the first server.

In some embodiments, the plant compute device may be further configured to receive the second gateway associated with the second server, deploy the second gateway on the plant compute device, and provide plant data obtained by the plant compute device to the second gateway for translation into the second protocol and transmission to the second server.

In some embodiments, the system may further include a third server that is configured to receive the first gateway associated with the first server and the second gateway associated with the second server, deploy the first and second gateways on the third server, receive a third data request from one of the first and second servers, and transfer, in response to receiving the third data request, third data into one of the first and second gateways for translation into one of the first and second protocols and transmission to the one of the first and second servers.

In some embodiments, to deploy the first and second gateways may include to deploy the first gateway in a second secured environment that is isolated to limit interactions with other applications running on the second server, and to deploy the second gateway in a first secured environment that is isolated to limit interactions with other applications running on the first server.

In some embodiments, the first server may further configured to determine whether the second server is authorized to obtain the data prior to transferring the second data. In such embodiments, the second server may further configured to determine whether the first server is authorized to obtain the data prior to transferring the first data.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
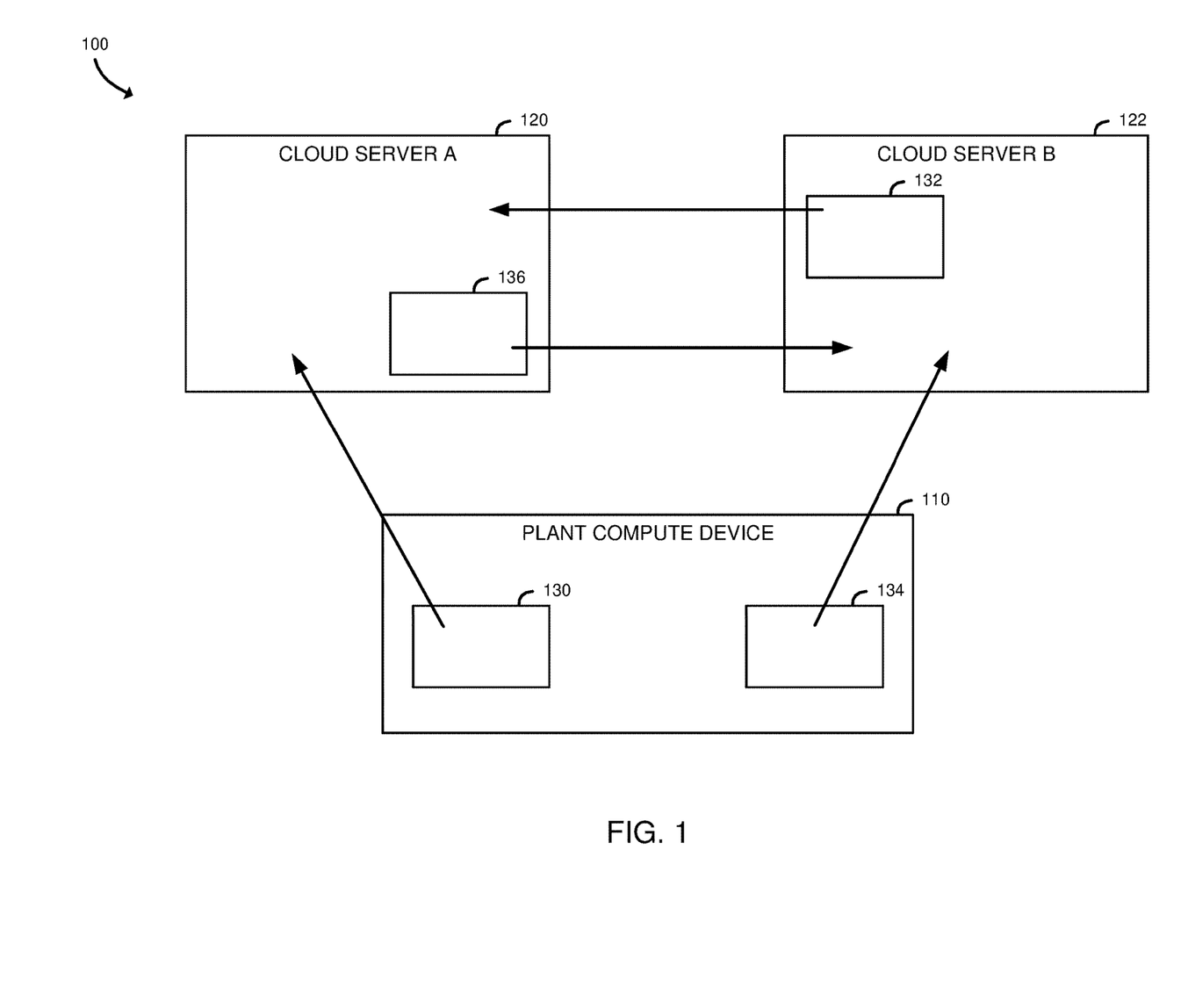
FIG. 1 is a simplified block diagram of at least one embodiment of a system for providing interoperability between multiple data providers and/or customers.

Referring now to FIG. 1, in one illustrative embodiment, a system 100 for providing interoperability between data providers and customers includes a plant compute device 110 in communication with multiple cloud servers 120, 122 located in one or more clouds. For example, the cloud may provide hosted services to clients (e.g., any processor-based devices) that communicate with a cloud server over a wired and/or wireless network. Each cloud server 120, 122 may be owned and/or operated by a different data provider (e.g., an asset vendor), and each cloud server 120, 122 may utilize a different protocol (e.g., a protocol proprietary to the owner/operator of the respective server). The term "protocol" is used in the present disclosure to refer to the formats, structures, semantics, representations, relationships, constraints, rules, operations, and/or information models that specify data on an associated server. The process of developing or adapting a common protocol between different data providers to enable communication between disparate cloud servers may require significant efforts. Instead, in the illustrative embodiment, a number of gateways 130, 132, 134, 136 are deployed to each import data in a protocol associated with one of the cloud servers 120, 122. It should be appreciated that, in the illustrative embodiment, the gateways 130, 132, 134, 136 are each deployed in a gateway sandbox (e.g., an isolated secured environment) to limit interactions with other applications. In other words, the gateways 130, 132, 134, 136 enable understanding and interpretation of data between the data providers and establish cloud-to-cloud interoperability between disparate systems without need to negotiate and develop a common protocol.

For example, as illustrated in FIG. 1, Vendors A and B have deployments in the same plant compute device 110, each with their own gateway and cloud integration. The plant compute device 110 includes one or more gateways 130, 134, each of which is associated with one of the cloud servers 120, 122. For example, a customer of the plant compute device 110 may determine what data is to be shared with the gateway 130 associated with Vendor A, and Vendor A controls the version and capabilities of the implementation of gateway 130. In other words, the gateway 130 collects data shared by the plant compute device 110 in its own protocol at the plant. As such, the transfer of data into the gateway sandbox (e.g., where the gateway 130 is deployed) may not require translation, as it is the data associated with Vendor A's asset that is being transferred. Similarly, ingestion of data from the plant compute device 110 to Vendor A's cloud server 120 also uses Vendor A's protocol.

Additionally, the gateway 132 associated with Vendor A may be deployed in the cloud server 122 of another vendor (Vendor B) to facilitate the translation and transfer of data from Vendor B to Vendor A. In use, once Vendor B transfers data into Vendor A's gateway 132 in Vendor B's cloud server 122, the data is translated to the protocol associated with Vendor A and is ingested back to Vendor A's cloud server 122. In other words, the gateway 132 is configured to translate data shared by Vendor B to the protocol associated with Vendor A, such that the translated data may be ingested by Vendor A.

It should be appreciated that, as illustrated in FIG. 1, a mirror deployment may be established to provide the capability for bi-directional transfer between the cloud servers without need for agreement on the protocol. In use, for example, Vendor A may provide a motor that drives the process at a customer plant (e.g., where the plant compute device 110 is deployed). The motor may be instrumented for vibration by Vendor B to detect a spike in vibration at the customer plant. Vendor B may also have a motor health application that monitors the health of the motor at the customer plant. The vibration is dependent on the motor load, and the motor health is indicated by the vibration. The motor health indicator is calibrated to motor load using the recorded past experience. In other words, each vendor may create additional value for customers if vendors have access to other vendor's data. To do so, Vendor B transfers the vibration anomaly information to Vendor A's gateway 132, including nameplate information for the monitored motor, with a request for the associated motor load. The gateway 132 translates the foreign vibration records to its protocol. Subsequently, Vendor A ingests the vibration, nameplate context, and motor load request from the gateway 132 to its home cloud. Upon receipt of the vibration indication, Vendor A's cloud server 120 computes the motor load based on electrical properties and transfers the information to Vendor B's gateway 136, including the nameplate information for the monitored motor. Vendor B's gateway 136 translates the foreign motor load records to its protocol. Vendor B's cloud server 122 ingests the motor load and nameplate context from the gateway 136 to its home cloud and completes the motor health application calculations.

In an illustrative embodiment, the cloud servers 120, 122 are each embodied as a virtual server running in a cloud computing environment. However, it should be appreciated that, in some embodiments, each cloud server may be embodied as any type of computing device capable of performing the functions described herein. For example, in some embodiments, the cloud server 120, 122 may be embodied as a server, blade server, desktop computer, laptop computer, tablet computer, notebook, netbook, Ultrabook™, cellular phone, smartphone, personal digital assistant, mobile Internet device, and/or any other computing/communication device. Further, in such embodiments, the cloud server 120, 122 may include components, sub-components, and devices commonly found in a typical computing device (e.g., various input/output devices and/or other components). In an illustrative embodiment, the gateways 130, 132, 134, 136 are embodied as software applications that are each deployed in one of the cloud servers 120, 122 or the plant compute device 110. However, it should be appreciated that, in some embodiments, the gateways may be physical components on a cloud network that functions as an entrance to another cloud network.

Figure 2:
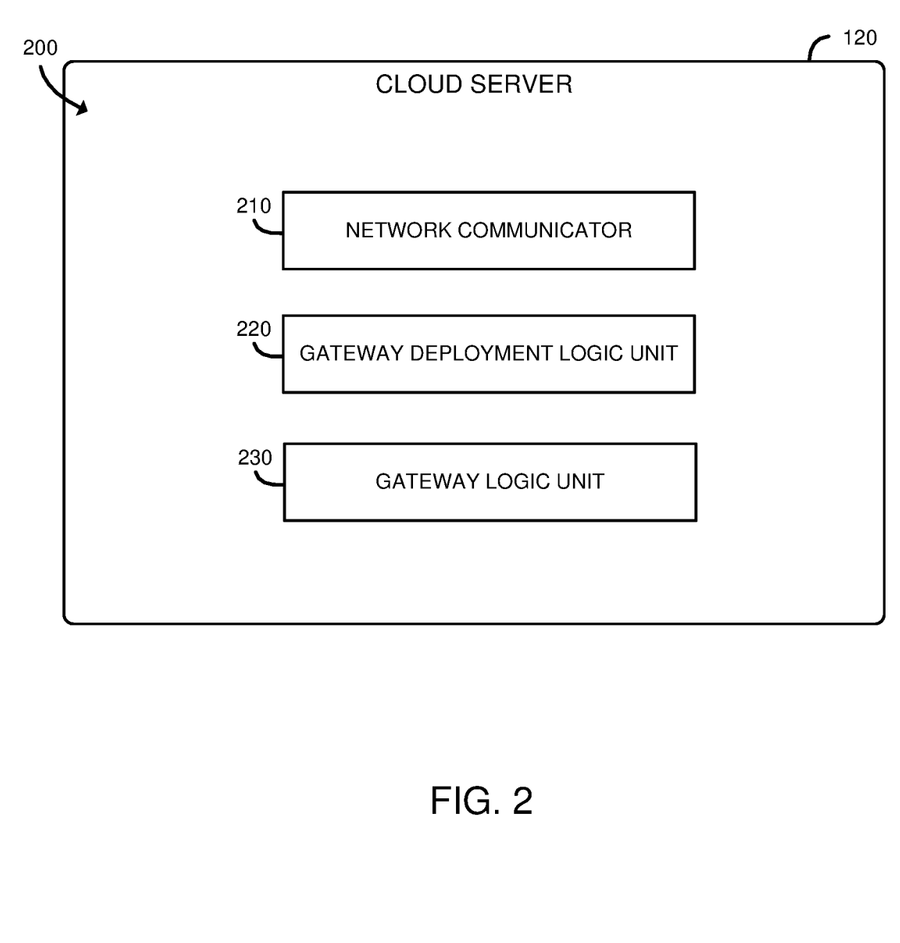
FIG. 2 is a simplified block diagram of at least one embodiment of a cloud server of a data provider of the system of FIG. 1.

Referring now to FIG. 2, in an illustrative embodiment, the cloud server 120 establishes an environment 200 during operation. The illustrative environment 200 includes a network communicator 210, a gateway deployment logic unit 220, and a gateway logic unit 230. The various components of the environment 200 may be embodied as hardware, firmware, software, or a combination thereof. As such, in some embodiments, one or more of the components of the environment 200 may be embodied as circuitry or collection of electrical devices (e.g., network communicator circuitry 210, gateway deployment logic unit circuitry 220, and/or gateway logic unit circuitry 230). It should be appreciated that, in such embodiments, one or more of the network communicator circuitry 210, the gateway deployment logic unit circuitry 220, and/or the gateway logic unit circuitry 230 may form a portion of the cloud server 120. Additionally, in some embodiments, one or more of the illustrative components may form a portion of another component and/or one or more of the illustrative components may be independent of one another.

The network communicator 210 is configured to communicate with the plant compute device 110 or cloud servers of other vendors (e.g., Vendor B's cloud server 122) to ingest and/or transfer data. For example, the network communicator 210 is configured to obtain and import plant data from the plant compute device 110. As discussed above, the plant data may be required in order to provide efficient service to the customer of the plant compute device 110 according to a service-level agreement between a customer and Vendor A. Additionally, the network communicator 210 is also configured to transfer data to and ingest data from another vendor's cloud server to establish cloud-to-cloud interoperability between the different vendors that have different protocols.

The gateway deployment logic unit 220 is configured to deploy one or more gateways within Vendor A's cloud server 120 and/or manage deployments of one or more gateways outside of Vendor A's cloud server 120. For example, the gateway deployment logic unit 220 may receive a gateway 136 associated with Vendor B from Vendor B's cloud server 122. In response, the gateway deployment logic unit 220 may deploy Vendor B's gateway 136 on Vendor A's cloud server 120, such that data obtained by or stored at Vendor A's cloud server 120 may be ingested by Vendor B. As discussed above, each gateway is configured to facilitate the translation of foreign data to its own protocol and transfer of the translated data from the foreign cloud server back to the home cloud server.

In another example, Vendor A's cloud server 120 may have deployments in the plant compute device 110 and in another vendor's cloud server (e.g., Vendor B's cloud server 122). To do so, the gateway deployment logic unit 220 may transmit one or more gateways 130, 132 associated with Vendor A to one or more plant compute devices and/or the other vendor's cloud server. In response, Vendor A's gateway 130 deployed in the plant compute device 110 may collect data shared by the customer's plant and mapped to its own protocol. Additionally, Vendor A's gateway 132 deployed in Vendor B's cloud server 122 may receive or obtain data from Vendor B and translate the data to its own protocol, which is subsequently ingested by Vendor A's cloud server 120.

The gateway logic unit 230 is configured to translate data to a protocol associated with the respective gateway. More specifically, the gateway logic unit 230 may transfer data that is to be transferred to another vendor into the gateway sandbox, where Vendor B's gateway 136 is deployed, for translation to its own protocol associated with Vendor B. As discussed above, the translated data is then ingested by Vendor B.

It is also contemplated that Vendor B's cloud server 122 may establish an environment similar to those described in FIG. 2 with reference to Vendor A's cloud server 120.

Figure 3:
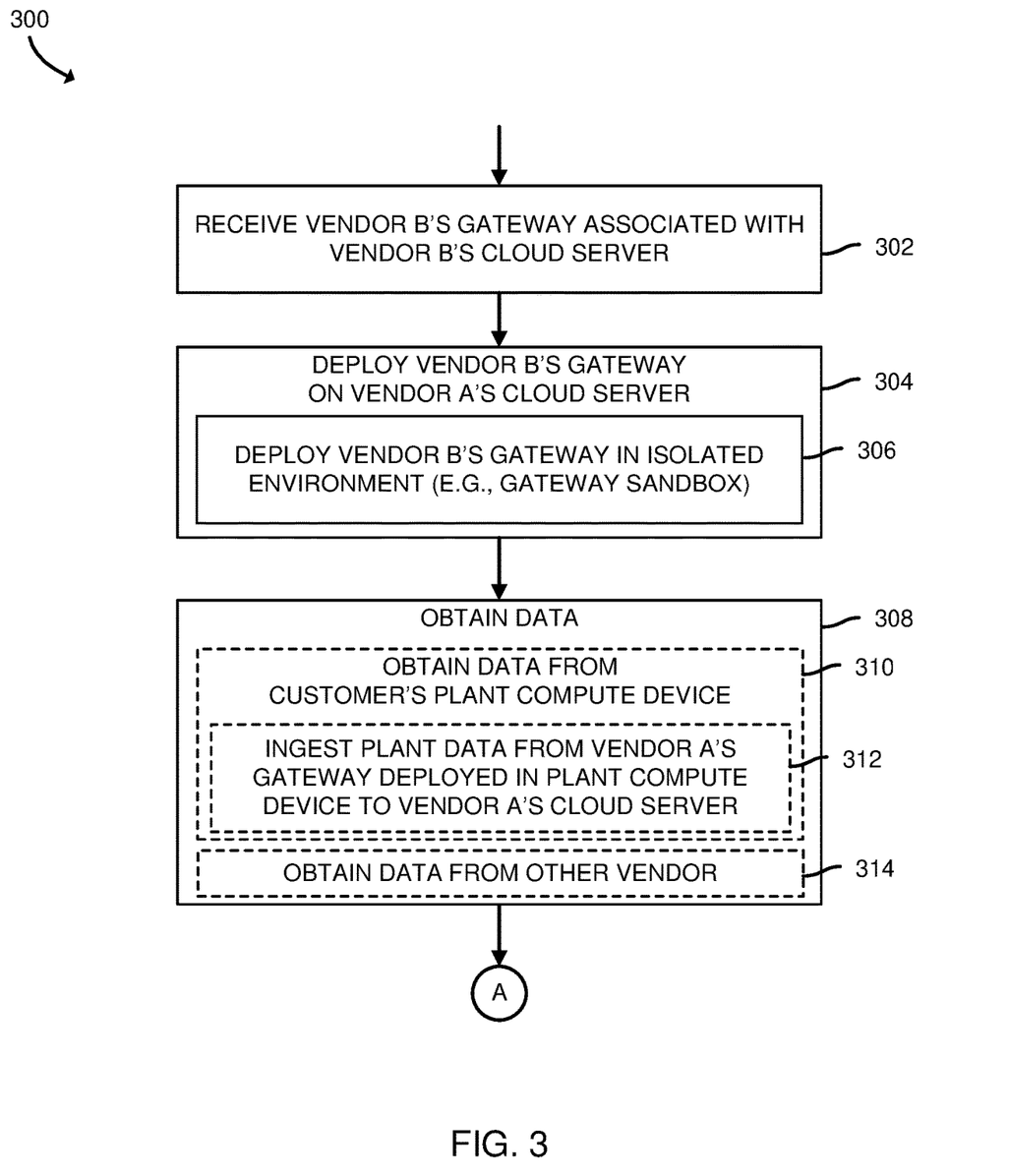
FIGS. 3 and 4 are a simplified flowchart of at least one embodiment of a method for providing interoperability between multiple data providers and/or customers.
Figure 4:
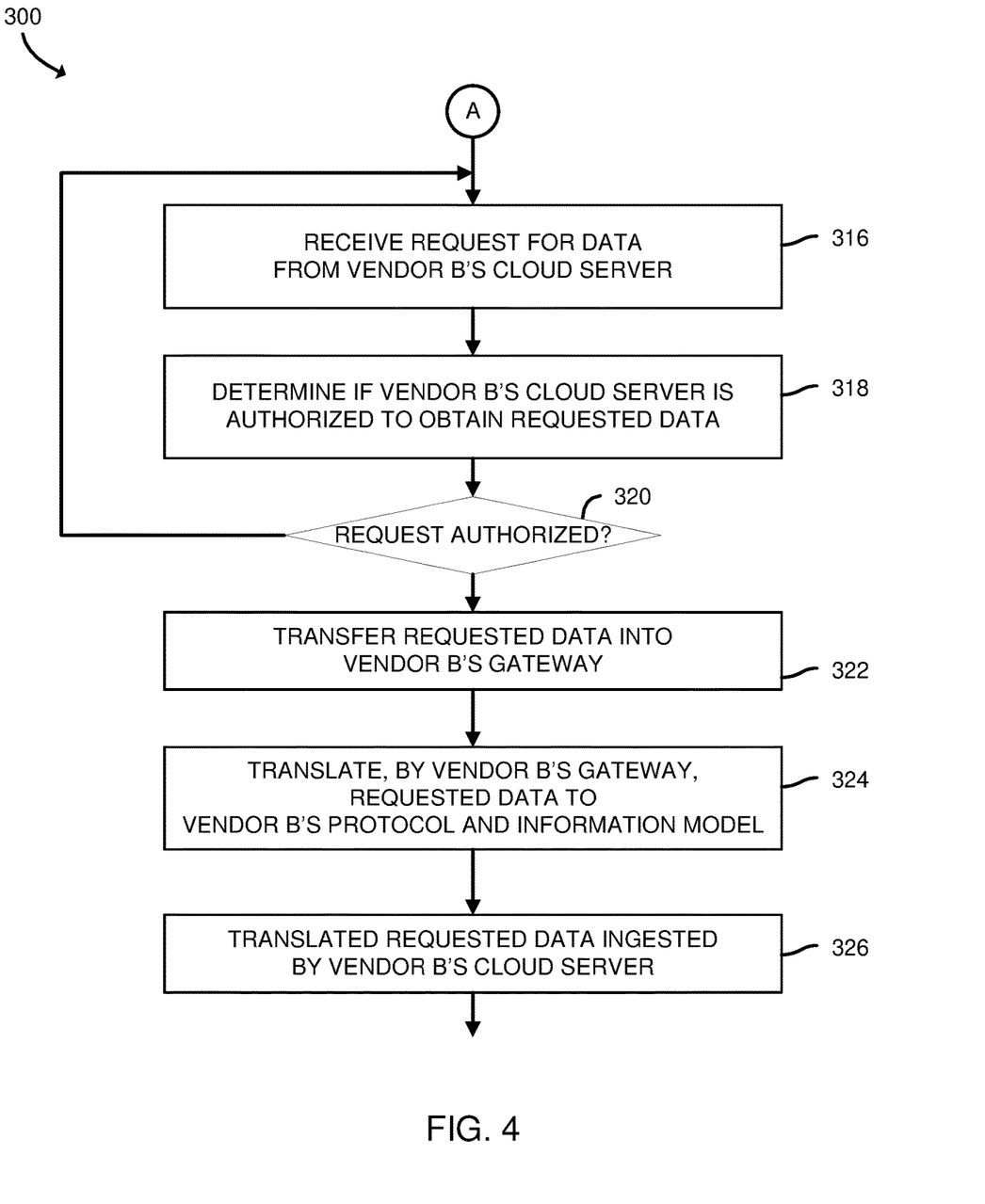

Referring now to FIGS. 3 and 4, Vendor A's cloud server 120, in operation, may execute a method 300 for providing interoperability between Vendor A and Vendor B. The method 300 begins with block 302 in which Vendor A's cloud server 120 receives a gateway 136 associated with Vendor B's cloud server 122. As discussed above, Vendor B's gateway 136 is configured to facilitate the translation of foreign data at Vendor A's cloud server 120 to its own protocol and transfer of the translated data from Vendor A's cloud server 120 back to Vendor B's cloud server 122. In block 304, the cloud server 120 deploys the gateway 136 associated with Vendor B on Vendor A's cloud server 120. To do so, the cloud server 120 deploys the gateway 136 in a secured and isolated environment, such as, for example, a gateway sandbox, to prevent access to or by other applications running on the cloud server 120 (or other resources of the cloud server 120), as indicated in block 306.

Subsequently or concurrently, the cloud server 120 obtains data in block 308. For example, the cloud server 120 may obtain data from a plant compute device 110, as indicated in block 310. More specifically, the cloud server 120 may obtain data from the plant compute device 110 filtered by a customer based on a server agreement for a quality of service (QoS) provided by Vendor A's cloud server 120. To do so, as indicated in block 312, the cloud server 120 may ingest data that has been collected at the customer plant by Vendor A's gateway 130 that has been deployed in the plant compute device 110. Additionally or alternatively, in some embodiments, the cloud server 120 may obtain data from other cloud servers associated with other vendors, as indicated in block 314. After obtaining the data, the method 300 advances to block 316 of FIG. 4. It should be appreciated that, in some embodiments, blocks 308-314 may be performed prior to performing block 302. In other words, in some embodiments, data may be obtained prior to and/or while deploying Vendor B's gateway 136.

In block 316, the cloud server 120 receives a request for data from Vendor B. Referring to the example described above, Vendor A's cloud server 120 may receive a request from Vendor B's cloud server 122 for the motor load associated with the motor that Vendor B is monitoring. In such an example, the request may include the nameplate information for the monitored motor and vibration anomaly information associated with the monitored motor. It should be appreciated that, in the illustrative embodiment, the information from Vendor B is ingested by Vendor A's cloud server 120 via Vendor A's gateway 132 deployed in Vendor B's cloud server 122. More specifically, the cloud server 122 may transfer the vibration anomaly information, the nameplate information for the monitored motor, and the motor load request to Vendor A's gateway 132. The gateway 132 translates the foreign data to the protocol associated with Vendor A. Vendor A then ingests the vibration, the nameplate information, and the motor load data from the gateway 132 to its cloud server 120.

In response to receiving the request, the cloud server 120 determines if Vendor B is authorized to obtain the requested data, as indicated in block 318. For example, whether Vendor B is authorized to obtain the requested data may depend on a service-level agreement between Vendor A and the customer of the plant compute device 110. Additionally or alternatively, it may depend on a service agreement between Vendors A and B. It should be appreciated that, in some embodiments, the determination of whether the requesting vendor is authorized to obtain the requested data may be performed prior to ingesting additional information other than the request itself.

If the cloud server 120 determines that Vendor B is unauthorized to obtain the requested data in block 320, the method 300 loops back to block 316 to continue waiting for a receipt of another request from Vendor B. If, however, the cloud server 120 determines that Vendor B is authorized to obtain the requested data, the method 300 advances to block 322. It should be appreciated that, in some embodiments, blocks 308-314 may be performed after performing any one of blocks 316-320. In other words, the requested data may be obtained after receiving the request for the data.

In block 322, Vendor A's cloud server 120 transfers the requested data into Vendor B's gateway 136. The gateway 136 is configured to translate the requested data to the protocol associated with Vendor B, as indicated in block 324. Subsequently, in block 326, the translated requested data is ingested by Vendor B. Referring back to the example discussed above, upon receiving the request and the vibration anomaly information from Vendor B, Vendor A's cloud server 120 may compute the motor load and transfer the information to Vendor B's gateway 136, including the nameplate information for the monitored motor. Subsequently, Vendor B's gateway 136 may translate the foreign motor load records to a protocol associated with Vendor B. This allows Vendor B to ingest the motor load and nameplate context from the gateway 136 to its cloud server 122 and complete the motor health application calculations.

Figure 5:
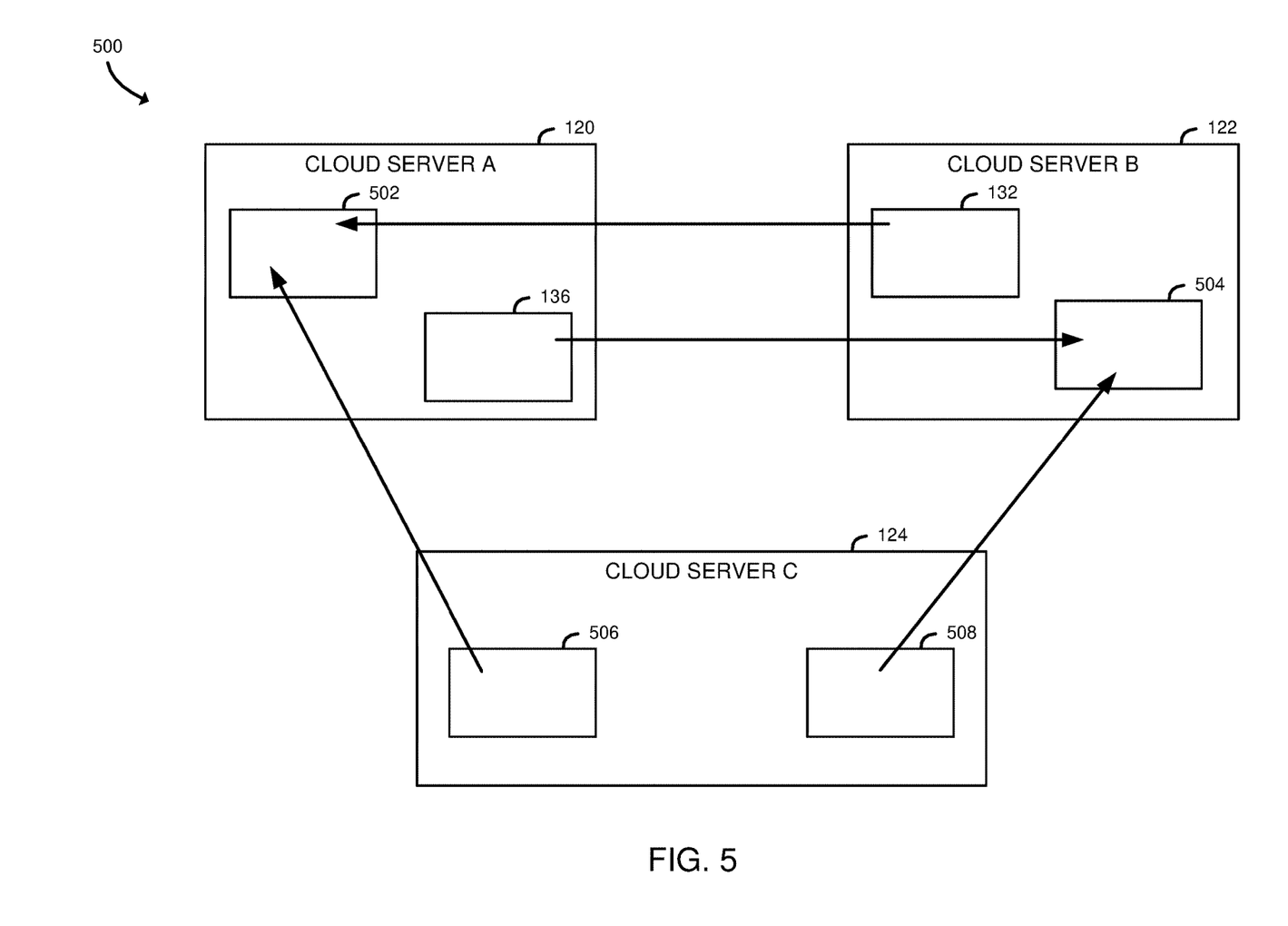
FIG. 5 is a simplified block diagram of another embodiment of a system for providing interoperability between multiple data providers and/or customers.

Referring now to FIG. 5, a system 500, similar to the system 100 shown in FIG. 1, for providing interoperability between multiple cloud servers 120, 122, 124 is shown. In the illustrative embodiment, the gateway components are reused as brokers 502, 504 to merge and manage data from multiple cloud vendors. The brokers 502, 504 are configured to maintain semantics of the data variables that are allowed to be exchanged between multiple vendors. For example, similar to the example provided above, Vendor B may have a motor health application that detects a spike in vibration at the customer site. The motor health indicator may be calibrated to motor load and ambient weather using recorded past experience. In the illustrative embodiment, Vendor B already has the ambient weather at the customer plant from Vendor C, transferred by subscription using Vendor B's gateway 508 in Vendor C's cloud server 124. Vendor B may transfer the vibration anomaly information to Vendor A's gateway 132, including the nameplate information for the monitored motor, with a request for the associated motor load. Vendor A's gateway 132 translates the foreign vibration records to its protocol. Subsequently, Vendor A ingests the vibration, nameplate context, and motor load request from the gateway 132 to its cloud server 120.

As discussed above, upon receipt of the vibration indication, Vendor A computes the motor load based on electrical properties and transfers the information to Vendor B's gateway 136, including the nameplate information for the monitored motor. Vendor B's gateway 136 translates the foreign motor load records to its protocol. Vendor B ingests the motor load and nameplate context from Vendor B's gateway 136 at Vendor A's cloud server 120 to Vendor B's cloud server 122. Subsequently, the broker 504 merges the readings with the ambient weather and completes the motor health application calculations on Vendor B's cloud server 122.

Additionally, in the illustrative embodiment, Vendor A also has a subscription to the weather data from Vendor C. In the illustrative embodiment, Vendor A may obtain the weather data using Vendor A's gateway 506 in Vendor C's cloud server 124. Vendor A may then use the weather data in a motor predictive maintenance application that recommends when the motor should be serviced, by way of example. The application may also depend on the vibration data from Vendor B to guide the recommendations. When Vendor B shares the motor vibration data with Vendor A, a broker 502 merges the vibration data with the ambient weather. This may allow Vendor A to update the predictive maintenance of the motor with the current status for the motor and the best time for performing planned service.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A first server comprising:
a network communicator configured to receive, from a second server, a second gateway associated with the second server and to receive a request for data from the second server;
a gateway deployment logic unit configured to deploy the second gateway on the first server in a secured environment that is isolated to limit interactions with other applications running on the first server, wherein the second gateway is configured to translate, on the first server, the data into a second protocol associated with the second server; and
a gateway logic unit configured to transfer, in response to receiving the request, the data into the second gateway for translation, on the first server, into the second protocol.

2. The first server of claim 1, wherein the network communicator is further configured to obtain the data from a plant compute device, wherein the data has been (i) filtered by a customer associated with the plant compute device based on a service agreement between an owner of the first server and the customer and (ii) translated by a first gateway deployed on the plant compute device into a first protocol associated with the first server.

3. The first server of claim 1, wherein the network communicator is further configured to obtain the data from a third server via a first gateway deployed on the third server, the first gateway being configured to translate data into a first protocol associated with the first server.

4. The first server of claim 1, wherein the gateway logic unit is further configured to determine whether the second server is authorized to obtain the data, wherein to transfer the data comprises to transfer the data in response to a determination that the second server is authorized to obtain the data.

5. The first server of claim 1, wherein the network communicator is further configured to transmit the translated data to the second server.

6. The first server of claim 1, wherein:
the gateway deployment logic unit is further configured to cause the network communicator to transmit a first gateway associated with the first server to the second server, wherein the first gateway is configured to be deployed in the second server to translate data into a first protocol associated with the first server; and
the network communicator is further configured to transmit a request for data to the second server and to obtain, in response to transmitting the request, the data in the first protocol from the second server.

7. A method comprising:
receiving, by a first server and from a second server, a second gateway associated with a second server, wherein the second gateway is configured to translate, on the first server, data into a second protocol associated with the second server;
deploying, by the first server, the second gateway on the first server in a secured environment that is isolated to limit interactions with other applications running on the first server;
receiving, by the first server, a first request for first data from the second server;
transferring, by the first server in response to receiving the first request, the first data into the second gateway; and
translating, by the second gateway on the first server, the first data into the second protocol.

8. The method of claim 7, further comprising obtaining the first data from a plant compute device, wherein the first data has been (i) filtered by a customer associated with the plant compute device and (ii) translated by a first gateway deployed in the plant compute device into a first protocol associated with the first server.

9. The method of claim 7, further comprising obtaining the first data from a third server via a first gateway deployed on the third server, the first data having been translated into a first protocol associated with the first server by the first gateway.

10. The method of claim 7, further comprising determining, by the second gateway, whether the second server is authorized to obtain the first data, wherein transferring the first data comprises transferring the first data in response to determining that the second server is authorized to obtain the first data.

11. The method of claim 7, further comprising transmitting the first data from the second gateway to the second server.

12. The method of claim 7, further comprising:
transmitting, by the first server, a first gateway associated with the first server to the second server, wherein the first gateway is configured to be deployed in the second server to translate data into a first protocol associated with the first server;
transmitting, by the first server, a second request for second data to the second server; and
obtaining, by the first server in response to transmitting the second request, the second data in the first protocol from the second server.

13. A system comprising:
a first server; and
a second server;
wherein the second server is configured to:
receive, from the first server, a first gateway associated with the first server;
deploy the first gateway on the second server in a second secured environment that is isolated to limit interactions with other applications running on the second server, wherein the first gateway is configured to translate, on the second server, data into a first protocol associated with the first server;
receive a first data request from the first server; and
transfer, in response to receiving the first data request, first data into the first gateway for translation, on the second server, into the first protocol and transmission to the first server; and
wherein the first server is configured to:
receive, from the second server, a second gateway associated with the second server;
deploy the second gateway on the first server in a first secured environment that is isolated to limit interactions with other applications running on the first server, wherein the second gateway is configured to translate data, on the first server, into a second protocol associated with the second server;
receive a second data request from the second server; and
transfer, in response to receiving the second data request, second data into the second gateway for translation, on the first server, into the second protocol and transmission to the second server.

14. The system of claim 13, further comprising a plant compute device configured to:
receive the first gateway associated with the first server;
deploy the first gateway on the plant compute device; and
provide plant data obtained by the plant compute device to the first gateway for translation into the first protocol and transmission to the first server.

15. The system of claim 14, wherein the plant compute device is further configured to:
receive the second gateway associated with the second server;
deploy the second gateway on the plant compute device; and
provide plant data obtained by the plant compute device to the second gateway for translation into the second protocol and transmission to the second server.

16. The system of claim 13, further comprising a third server configured to:
receive the first gateway associated with the first server and the second gateway associated with the second server;
deploy the first and second gateways on the third server;
receive a third data request from one of the first and second servers; and
transfer, in response to receiving the third data request, third data into one of the first and second gateways for translation into one of the first and second protocols and transmission to the one of the first and second servers.

17. The system of claim 13, wherein:
the first server is further configured to determine whether the second server is authorized to obtain the data prior to transferring the second data; and
the second server is further configured to determine whether the first server is authorized to obtain the data prior to transferring the first data.

* * * * *